US012743101B2

(12) United States Patent
Park

(10) Patent No.: US 12,743,101 B2
(45) Date of Patent: Sep. 22, 2026

(54) ELECTRONIC DEVICE AND CONTROL METHOD THEREOF

(71) Applicants: Hyundai Motor Company, Seoul (KR); Kia Corporation, Seoul (KR)

(72) Inventor: Gi Yong Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 120 days.

(21) Appl. No.: 18/737,356

(22) Filed: Jun. 7, 2024

(65) Prior Publication Data

US 2025/0258501 A1 Aug. 14, 2025

(30) Foreign Application Priority Data

Feb. 14, 2024 (KR) ........................ 10-2024-0021204

(51) Int. Cl.

*G05D 1/644* (2024.01)
*G05D 1/246* (2024.01)
*G05D 1/622* (2024.01)
*G05D 1/646* (2024.01)
*G05D 111/10* (2024.01)

(52) U.S. Cl.

CPC ............ *G05D 1/644* (2024.01); *G05D 1/246* (2024.01); *G05D 1/622* (2024.01); *G05D 1/646* (2024.01); *G05D 2111/17* (2024.01)

(58) Field of Classification Search

None

See application file for complete search history.

(56) References Cited

U.S. PATENT DOCUMENTS 9,758,305 B2 9/2017 Johnson et al.
11,151,992 B2 10/2021 Cui et al.
11,493,925 B2 11/2022 Moore
2017/0029213 A1 2/2017 Johnson et al.

(Continued)

FOREIGN PATENT DOCUMENTS

CN 111105495 A 5/2020
CN 115979272 A 4/2023

(Continued)

OTHER PUBLICATIONS

Chaplot, Devendra Singh, et al., "Object Goal Navigation Using Goal-Oriented Semantic Exploration," Advances in Neural Information Processing Systems, vol. 33, p. 4247-4258, Jul. 2, 2020, Total pp. 11.

*Primary Examiner* — Davin Seol

(74) *Attorney, Agent, or Firm* — Slater Matsil, LLP

(57) ABSTRACT

In the electronic device, and a control method thereof, the at least one processor can obtain a sub-map, from the semantic map, including a candidate area in which a robot is able to be located according to a movement command, where the candidate area is within a set distance relative to a position of the target object, segment the candidate area into a plurality of cells, based on a footprint of the robot, and determine a target cell among the plurality of cells, based on one of or any combination of a first input about a cost of each of the plurality of cells, a second input about a cell-target distance between each of the plurality of cells and the target object, or a third input about a cell-robot distance between each of the plurality of cells and the robot.

16 Claims, 10 Drawing Sheets

(56) References Cited

U.S. PATENT DOCUMENTS

2017/0261992 A1 9/2017 Johnson et al.
2019/0206400 A1* 7/2019 Cui ........................ B25J 9/1697
2021/0278850 A1 9/2021 Moore
2021/0286368 A1* 9/2021 Jung .................... A01D 34/008
2021/0370511 A1 12/2021 Hong
2022/0269273 A1 8/2022 Choi et al.
2023/0184949 A1 6/2023 Huang et al.
2024/0111306 A1* 4/2024 Oshiro ................. G05D 1/6445

FOREIGN PATENT DOCUMENTS

JP 2022128579 A 9/2022
KR 101105325 B1 * 1/2012 ............. G05D 1/622
KR 20200036678 A 4/2020
KR 102121132 B1 6/2020
KR 102572336 B1 8/2023
WO 2021178614 A1 9/2021

* cited by examiner

ELECTRONIC DEVICE AND CONTROL METHOD THEREOF

CROSS-REFERENCE TO RELATED APPLICATIONS

This application claims the benefit of priority to Korean Patent Application No. 10-2024-0021204, filed in the Korean Intellectual Property Office on Feb. 14, 2024, the entire contents of which are incorporated herein by reference.

TECHNICAL FIELD

The present disclosure relates to an electronic device and a control method thereof, for moving a robot to a target object.

BACKGROUND

Recently, there has been a technology for searching for a target object and moving to the target object as one of methods for allowing a robot to interact with a general user in more various manners. However, for the movement of the robot, an input value for a target point may be a target object, but a target position can be finally calculated as a point and can be delivered to the robot. Furthermore, when the position of an object to be reached changes, there is a need to reflect the changed position of the target object in real time, rather than a predefined point, to calculate a final target position and estimate an accurate final target position.

SUMMARY

The present disclosure relates to an electronic device and a control method thereof, and more particularly, relates to technologies for more accurately moving a robot to a target object, when receiving a command to move to the target object.

Some embodiments of the present disclosure can solve the above-mentioned problems occurring in the prior art while advantages achieved by the prior art are maintained intact.

Some embodiments of the present disclosure can provide a technology for identifying a target object, setting an area around the target object, determining one point that is a destination depending on a distance between a robot and the target object, and redetermining the destination depending on an obstacle identified during movement.

An embodiment of the present disclosure can provide an electronic device for dividing a plurality of cells in which a robot is able to be located, in a sub-map obtained based on a semantic map and a cost map, and determining a target cell that is a destination based on costs of the cells and a distance between an object and the robot to determine the target cell to perform a command to move from a user to a target object to be suitable for an intention of the user and a control method thereof.

An embodiment of the present disclosure can provide an electronic device for generating a map-based local cost map by use of a sensor included in a robot from a time point when the robot is controlled to move to a center position of the target cell, identifying an obstacle located in an area included in a selected, set, or predetermined distance with respect to the position of the robot, and redetermining the target cell depending to the position of the obstacle and a control method thereof.

Technical problems to be solved by some embodiments of the present disclosure are not limited to the aforementioned problems, and other technical problems not mentioned herein can be solved with some embodiments of the present disclosure, which can be understood from the following description by those skilled in the art to which the present disclosure pertains.

According to an embodiment of the present disclosure, an electronic device may include a memory storing computer-executable instructions and at least one processor that accesses the memory and executes the instructions. The at least one processor may obtain a sub-map including a candidate area in which a robot is able to be located according to a movement command to move a robot to a target object among areas identified at a selected, set, or predetermined distance with respect to a position of the target object, from a semantic map, based on identifying the movement command from command data, may segment the candidate area into a plurality of cells, based on a footprint of the robot, the footprint being obtained by applying a size of the robot to the sub-map, and may determine a target cell being a destination of the movement command among the plurality of cells, based on at least one of a first input about a cost of each of the plurality of cells, a second input about a distance between each of the plurality of cells and the target object, or a third input about a distance between each of the plurality of cells and the robot, or any combination thereof.

In an embodiment, the at least one processor may recognize the target object from the movement command, may apply the target object to the semantic map to obtain the position of the target object represented on the semantic map, may identify obstacles included in the semantic map, based on a map-based global cost map generated by use of a light detection and ranging (LiDAR) sensor, and may determine an area excluding the identified obstacles from the semantic map as the candidate area.

In an embodiment, the at least one processor may transition the size of the robot to a coordinate system of the sub-map to obtain the footprint indicating the size of the robot from the sub-map and may segment the candidate area into the plurality of cells in which the robot is able to be located, based on a size of the footprint.

In an embodiment, the at least one processor may receive a weight group for determining the target cell, may identify a first weight, a second weight, and a third weight from the weight group, and may determine the target cell, based on at least one of a value obtained by applying the first weight to the first input, a value obtained by applying the second weight to the second input, or a value obtained by applying the third weight to the third input, or any combination thereof.

In an embodiment, the at least one processor may apply the sub-map to a map-based global cost map generated by use of a light detection and ranging (LiDAR) sensor to obtain the cost of each of the plurality of cells, may determine a first sub-input of a temporary cell among the plurality of cells, the first sub-input being included in the first input, based on comparison between a cost of the temporary cell and a selected, set, or predetermined cost, may determine a second sub-input of the temporary cell, the second sub-input being included in the second input, based on a first distance being a straight distance between a center position of the temporary cell and the target object, may determine a third sub-input of the temporary cell, the third sub-input being included in the third input, based on a second distance being a path distance about a path along which the robot moves to the center position of the temporary cell, and may determine a movement cost of the temporary cell, based on at least one of the first sub-input, the second sub-input, or the third sub-input, or any combination thereof.

In an embodiment, the at least one processor may identify a position of the target object and a position of the robot from the semantic map, may determine a straight distance between the center position of the temporary cell and the position of the target object as the first distance, may apply the center position of the temporary cell and the position of the robot to a path generation model trained to calculate a path to obtain the path along which the robot moves to the center position of the temporary cell, and may determine a length of the path obtained from the path generation model as the second distance.

In an embodiment, the at least one processor may determine a cell with a lowest movement cost among the plurality of cells as the target cell, based on that movement costs of all cells included in the plurality of cells are determined.

In an embodiment, the at least one processor may control the robot to move to a center position of the target cell, based on that the target cell is determined.

In an embodiment, the at least one processor may obtain a map-based local cost map generated by use of a sensor included in the robot, from a time point when the robot is controlled to move to the center position of the target cell and may identify an obstacle being present in an area identified at a selected, set, or predetermined distance with respect to a position of the robot, based on the local cost map.

In an embodiment, the at least one processor may determine whether the obstacle is included in a path along which the robot moves to the center position of the target cell, based on identifying the obstacle from the local cost map and may redetermine the target cell being the destination of the movement command among the plurality of cells, on the basis of the position of the robot, based on the obstacle being included in the path of the robot.

According to an embodiment of the present disclosure, a control method may include obtaining a sub-map including a candidate area in which a robot is able to be located according to a movement command to move a robot to a target object among areas identified at a selected, set, or predetermined distance with respect to a position of the target object, from a semantic map, based on identifying the movement command from command data, segmenting the candidate area into a plurality of cells, based on a footprint of the robot, the footprint being obtained by applying a size of the robot to the sub-map, and determining a target cell being a destination of the movement command among the plurality of cells, based on at least one of a first input about a cost of each of the plurality of cells, a second input about a distance between each of the plurality of cells and the target object, or a third input about a distance between each of the plurality of cells and the robot, or any combination thereof.

In an embodiment, the obtaining of the sub-map may include recognizing the target object from the movement command, applying the target object to the semantic map to obtain the position of the target object represented on the semantic map, identifying obstacles included in the semantic map, based on a map-based global cost map generated by use of a LiDAR sensor, and determining an area excluding the identified obstacles from the semantic map as the candidate area.

In an embodiment, the segmenting of the candidate area into the plurality of cells may include transitioning the size of the robot to a coordinate system of the sub-map to obtain the footprint indicating the size of the robot from the sub-map and segmenting the candidate area into the plurality of cells in which the robot is able to be located, based on a size of the footprint.

In an embodiment, the determining of the target cell may include receiving a weight group for determining the target cell, identifying a first weight, a second weight, and a third weight from the weight group, and determining the target cell, based on at least one of a value obtained by applying the first weight to the first input, a value obtained by applying the second weight to the second input, or a value obtained by applying the third weight to the third input, or any combination thereof.

In an embodiment, the determining of the target cell may include applying the sub-map to a map-based global cost map generated by use of a LiDAR sensor to obtain the cost of each of the plurality of cells, determining a first sub-input of a temporary cell among the plurality of cells, the first sub-input being included in the first input, based on comparison between a cost of the temporary cell and a selected, set, or predetermined cost, determining a second sub-input of the temporary cell, the second sub-input being included in the second input, based on a first distance being a straight distance between a center position of the temporary cell and the target object, determining a third sub-input of the temporary cell, the third sub-input being included in the third input, based on a second distance being a path distance about a path along which the robot moves to the center position of the temporary cell, and determining a movement cost of the temporary cell, based on at least one of the first sub-input, the second sub-input, or the third sub-input, or any combination thereof.

In an embodiment, the determining of the movement cost of the temporary cell may include identifying a position of the target object and a position of the robot from the semantic map, determining a straight distance between the center position of the temporary cell and the position of the target object as the first distance, applying the center position of the temporary cell and the position of the robot to a path generation model trained to calculate a path to obtain the path along which the robot moves to the center position of the temporary cell, and determining a length of the path obtained from the path generation model as the second distance.

In an embodiment, the determining of the target cell may include determining a cell with a lowest movement cost among the plurality of cells as the target cell, based on that movement costs of all cells included in the plurality of cells are determined.

In an embodiment, the control method may further include controlling the robot to move to a center position of the target cell, based on that the target cell is determined.

In an embodiment, the controlling of the robot may include obtaining a map-based local cost map generated by use of a sensor included in the robot, from a time point when the robot is controlled to move to the center position of the target cell, and identifying an obstacle being present in an area identified at a selected, set, or predetermined distance with respect to a position of the robot, based on the local cost map.

In an embodiment, the controlling of the robot may include determining whether the obstacle is included in a path along which the robot moves to the center position of the target cell, based on identifying the obstacle from the local cost map, and redetermining the target cell being the destination of the movement command among the plurality of cells, on the basis of the position of the robot, based on that the obstacle is included in the path of the robot.

BRIEF DESCRIPTION OF THE DRAWINGS

The above and other features and advantages of the present disclosure can be more apparent from the following detailed description taken in conjunction with the accompanying drawings, in which.

Figure 1:
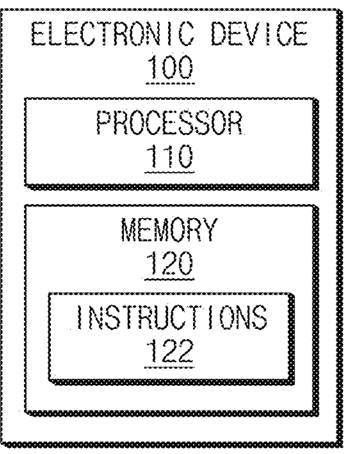
FIG. 1 is a drawing illustrating an electronic device according to an embodiment of the present disclosure.

With regard to the description of drawings, same or similar denotations may be used for same or similar components.

DETAILED DESCRIPTION OF ILLUSTRATIVE EMBODIMENTS

Hereinafter, some example embodiments of the present disclosure will be described in detail with reference to the illustrative drawings. In adding the reference numerals to the components of each drawing, it can be noted that the identical component can be designated by the identical numerals even when they are displayed on other drawings. In addition, a detailed description of well-known features or functions can be omitted to not unnecessarily obscure the gist of the present disclosure. Hereinafter, various example embodiments of the present disclosure are described with reference to the accompanying drawings. However, it can be understood that this is not intended to limit the present disclosure to specific implementation forms and the present disclosure includes various modifications, equivalents, and/or alternatives of example embodiments described in the present disclosure. With regard to description of drawings, similar components may be marked by similar reference numerals.

In describing components of example embodiments of the present disclosure, the terms “first”, “second”, “A”, “B”, “(a)”, “(b)”, and the like, may be used herein. Such terms can be used merely to distinguish one component from another component, but do not necessarily limit the corresponding components irrespective of the order or priority of the corresponding components. Furthermore, unless otherwise defined, terms including technical and scientific terms used herein can have a same meaning as being generally understood by those skilled in the art to which the present disclosure pertains. Such terms as those defined in a generally used dictionary can be interpreted as having meanings equal to the contextual meanings in the relevant field of art, and are not to be interpreted as having ideal or excessively formal meanings unless clearly defined as having such in the present application. For example, the terms, such as “first”, “second”, “1st”, “2nd”, or the like, can be used in the present disclosure to refer to various components regardless of the order and/or the priority and to distinguish one component from another component, but do not necessarily limit the components. For example, a first user device and a second user device indicate different user devices, irrespective of the order and/or priority. For example, without departing the scopes of the present disclosure, a first component may be referred to as a second component, and similarly, a second component may be referred to as a first component.

In the present disclosure, the expressions “have”, “may have”, “include” and “comprise”, or “may include” and “may comprise” indicate existence of corresponding features (e.g., components such as numeric values, functions, operations, or parts), but do not exclude presence of additional features.

It can be understood that when a component (e.g., a component) is referred to as being “(operatively or communicatively) coupled with/to” or “connected to” another component (e.g., a second component), it can be directly coupled with/to or connected to the other component or an intervening component (e.g., a third component) may be present. In contrast, when a component (e.g., a first component) is referred to as being “directly coupled with/to” or “directly connected to” another component (e.g., a second component), it can be understood that there is no intervening component (e.g., a third component).

According to the situation, the expression “configured to” used in the present disclosure may be used exchangeably with, for example, the expression “suitable for”, “having the capacity to”, “designed to”, “adapted to”, “made to”, or “capable of”.

The term “configured to” must not only mean “specifically designed to” in hardware. Instead, the expression “a device configured to” may refer to the device being “capable of” operating together with another device or other parts. For example, a “processor configured to perform A, B, and C” may refer to a generic-purpose processor (e.g., a central processing unit (CPU) or an application processor) that may perform corresponding operations by executing one or more software programs that store a dedicated processor (e.g., an embedded processor) for performing a corresponding operation or a memory device. Terms used in the disclosure can be used to describe specified example embodiments and are not intended to necessarily limit the scope of another potential embodiment. Terms of a singular form may include plural forms unless the context clearly indicates otherwise. Terms used herein, which include technical or scientific terms, may have a same meaning that is generally understood by a person skilled in the art described in the present disclosure. It can be further understood that terms, which are defined in a dictionary and commonly used, can also be interpreted as is customary in the relevant related art and not in an idealized or overly formal detect unless expressly so defined herein in various embodiments of the present disclosure. In some cases, even though terms are terms which are defined in the specification, they may not be interpreted to exclude embodiments of the present disclosure.

In the present disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Furthermore, in describing an embodiment of the present disclosure, each of such phrases as "A or B", "at least one of A and B", "at least one of A or B", "A, B, or C", "at least one of A, B, and C", "at least one of A, B, or C", and "at least one of A, B, or C, or any combination thereof" may include any one of, or all possible combinations of the items enumerated together in a corresponding one of the phrases. Particularly, the phrase such as "at least one of A, B, or C, or any combination thereof" may include "A", "B", or "C", or "AB" or "ABC", which is a combination thereof.

Hereinafter, some example embodiments of the present disclosure will be described in detail with reference to FIGS. 1 to 9.

FIG. 1 is a drawing illustrating an electronic device according to an embodiment of the present disclosure.

An electronic device 100 according to an embodiment may include a processor 110 and a memory 120 including instructions 122, either or both of which may be in plural or may include plural components thereof.

The electronic device 100 may indicate a device for determining a destination of a robot depending on a movement command and determining a movement path of the robot. For example, the electronic device 100 may receive command data. The electronic device 100 may identify a movement command associated with movement of the robot from the command data. When identifying the movement command, the electronic device 100 may identify a position of a target object from a semantic map. When identifying the position of the target object, the electronic device 100 may determine a destination of the robot, based on the semantic map and a cost map. When determining the destination of the robot, the electronic device 100 may control the robot to move to the destination. A detailed description of the method for determining the destination of the robot in the electronic device 100 will be described below with reference to FIGS. 4 to 6.

The semantic map may indicate a map for expressing pieces of semantic information of a space in which the robot is able to travel. For example, the semantic information may include at least one of meaning of an object, a degree of understanding of a scene, or pieces of information of an environment, or any combination thereof. Particularly, the semantic map may include pieces of semantic information of objects, as well as geometric information of the space. The electronic device 100 may perform an operation of identifying a position of the target object, based on the semantic map, and an operation of obtaining a sub-map including the target object and a candidate area in which the robot is able to be located.

The cost map may indicate a map including probabilities that an object may be present at a specific position, based on data obtained by use of a sensor by the robot. In detail, the cost map may be obtained by applying a filter or the like to the map and may include a feature map including a terrain near a point at which the robot is located and a feature of the map. For example, probabilities of the cost map may be expressed on grids in a selected, set, or predetermined shape, respectively. The probability may be expressed as between "0" and "255", but not limited thereto. The cost map may include a local cost map and a global cost map. The local cost map may indicate a map generated by use of the sensor of the robot. The global cost map may indicate a map generated based on data such as predefined or historical map information. The electronic device 100 may use the global cost map to determine the destination of the robot. Thereafter, the electronic device 100 may use the local cost map to identify an obstacle around the robot. A detailed description associated with the cost maps will be described in detail below with reference to FIGS. 5A and 5B.

The processor 110 may execute software and may control at least one other component (e.g. a hardware or software component) connected with the processor 110. In addition, the processor 110 may perform a variety of data processing and/or calculation. For example, the processor 110 may store command data, the semantic map, the cost map, and the like in the memory 120 (storage medium).

For reference, the processor 110 may perform all operations performed by the electronic device 100. Therefore, for convenience of description in the specification, the operation performed by the electronic device 100 is mainly described as an operation performed by the processor 110. Furthermore, for convenience of description in the specification, the processor 110 is mainly described as, but not limited to, one processor. For example, the electronic device 100 may include at least one processor, together or separated. Each of the at least one processor may perform all operations associated with an operation performed by the electronic device 100.

The memory 120 may temporarily and/or permanently store various pieces of data and/or information required to perform the operation of determining the destination of the robot. For example, memory 120 may store the command data, the semantic map, the cost map, and the like.

In addition, the electronic device 100 may further include a communication device (not shown). The communication device may assist in performing communication between the electronic device 100 and a user terminal. For example, the communication device may include one or more components for performing communication between the electronic device 100 and the user terminal. For example, the communication device may include a short range wireless communication unit, a microphone, or the like. For example, a short range communication technology may be, but is not limited to, a wireless LAN (Wi-Fi), Bluetooth, ZigBee, Wi-Fi Direct (WFD), ultra-wideband (UWB), infrared data association (IrDA), Bluetooth low energy (BLE), near field communication (NFC), or the like.

Figure 2:
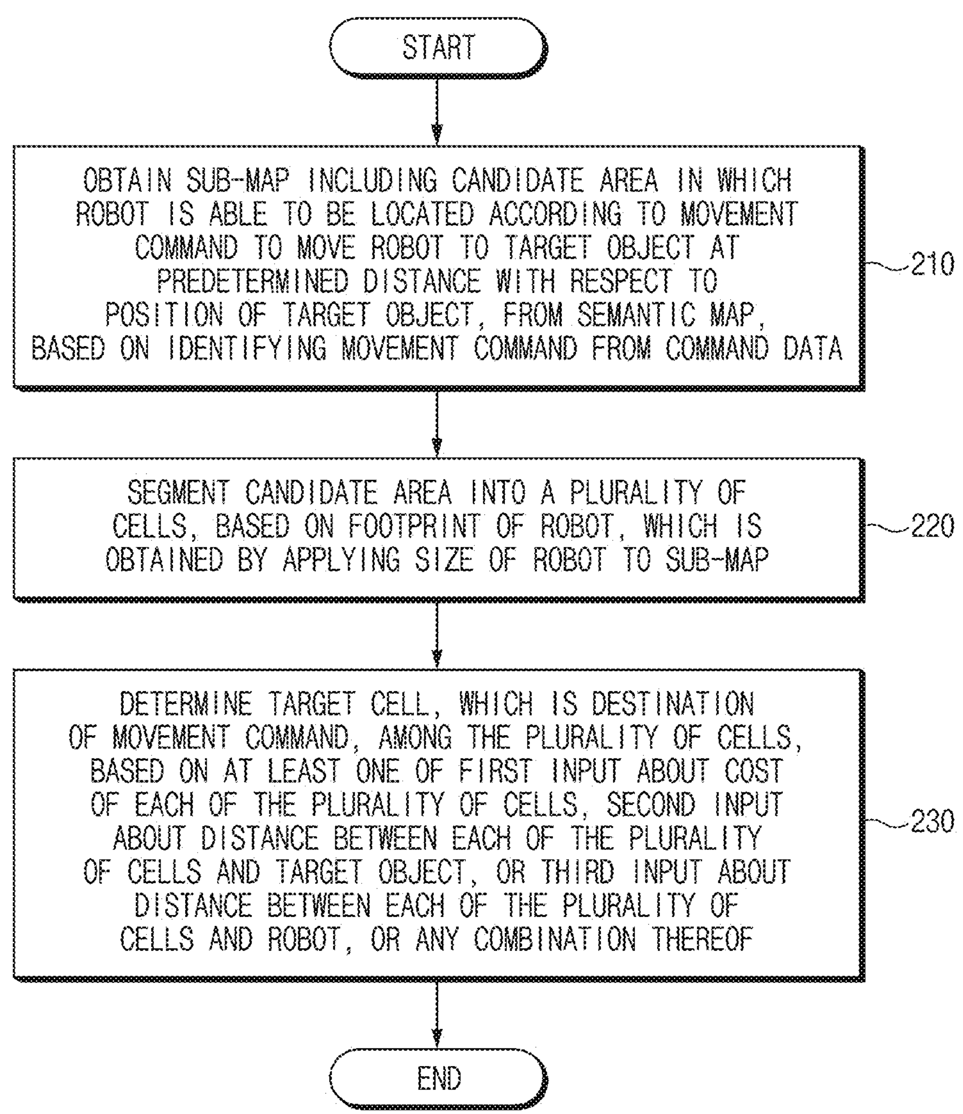
FIG. 2 is a flowchart for describing a control method according to an embodiment of the present disclosure.

FIG. 2 is a flowchart for describing a control method according to an embodiment of the present disclosure.

In operation 210, an electronic device (e.g., an electronic device 100 of FIG. 1) according to an embodiment may obtain a sub-map including a candidate area in which a robot is able to be located according to a movement command. For example, the electronic device may identify the movement command to move the robot to a target object from command data. The electronic device may obtain the sub-map including the candidate area in which the robot is able to be located according to the movement command among areas identified at a selected, set, or predetermined distance with respect to the position of the target object, from the semantic map, based on identifying the movement command. In other words, the sub-map may include a drivable area in which the robot is able to move because there is no obstacle near the target object. In other words, the sub-map may include an area in which the robot is able to be located in a space with the target object or the robot is able to travel. Thus, for convenience of description in the specification, the drivable area, the movable area, and the candidate area will be described as indicating the same area, but they may differ and may be distinct.

In operation 220, the electronic device may segment the candidate area into a plurality of cells. For example, the electronic device may apply a size of the robot to the sub-map to obtain a footprint of the robot. The electronic device may segment the candidate area into the plurality of cells, based on the footprint of the robot. The electronic device may determine at least one of the plurality of cells as a destination of the robot. The electronic device may obtain the footprint of the robot, based on comparing an actual size of the robot with an actual size of an actual space of the sub-map.

In operation 230, the electronic device may determine a target cell, which can be a destination of the movement command, among the plurality of cells. For example, the electronic device may determine the target cell among the plurality of cells, based on at least one of a first input about a cost of each of the plurality of cells, a second input about a distance between each of the plurality of cells and the target object, or a third input about a distance between each of the plurality of cells and the robot, or any combination thereof. The target cell may include an area at which the robot is able to arrive.

The first input may include values about the cost of each of the plurality of cells. For example, the value about the cost may indicate a value according to the result of comparing the cost with a selected, set, or predetermined threshold. The cost of the cell may be obtained from a global cost map. Therefore, the value about the cost of the cell may indicate the result of comparing a probability expressed in a global cost map with a selected, set, or predetermined probability. Illustratively, when the cost of the cell is greater than or equal to "250", the first input of the above-mentioned cell (e.g., the value about the cost of the cell) may be "−5". In other words, when the cost of the cell is less than "250", the first input of the above-mentioned cell may be "0". Such examples are for convenience of description, which may be changed for other embodiments.

The second input may include values about the distance between each of the plurality of cells and the target object. For example, in conjunction with the second input, the value about the distance may indicate a value according to the result of comparing the distance between the cell and the target object and the selected, set, or predetermined threshold. Illustratively, when the distance between the cell and the target object is less than 1 meter, the above-mentioned second input of the cell (e.g., the value about the distance) may be "10". In other words, when the distance between the cell and the target object is greater than or equal to 1 meter and is less than 3 meters, the above-mentioned second input of the cell may be "5". Such examples are for convenience of description, which may be changed for other embodiments.

The third input may include values about the distance between each of the plurality of cells and the robot. For example, in conjunction with the third input, the value about the distance may indicate a value according to the result of comparing the distance between the cell and the robot and the selected, set, or predetermined threshold. Illustratively, when the distance between the cell and the robot is less than 1 meter, the above-mentioned third input of the cell (e.g., the value about the distance) may be "5". In other words, when the distance between the cell and the robot is greater than or equal to 1 meter and is less than 3 meters, the above-mentioned third input of the cell may be "3". Such examples are for convenience of description, which may be changed by other embodiments.

The electronic device may determine the target cell, using the first to third inputs in operations that will be described below with reference to FIGS. 5A and 5B. However, the method for determining the target cell in the electronic device is not limited thereto. For example, the electronic device may apply the first to third inputs and the sub-map to an optimal cost calculation module trained to calculate a reachable area, thus determining the target cell among the plurality of cells included in the sub-map. Hereinafter, in FIG. 2, a detailed description of the optimal cost calculation model will be described.

In conjunction with the optimal cost calculation model, the electronic device may train the optimal cost calculation model. Illustratively, the optimal cost calculation model may include a neural network. The neural network may include a plurality of layers. Each layer may include a plurality of nodes. The node may have a node value determined based on an activation function. A node of any layer may be connected with a node (e.g., another node) of another layer through a link (e.g., a connection edge) with a connection weight. The node value of the node may be propagated to other nodes through the link. In an inference operation of the neural network, node values may be forward propagated in the direction of a next layer from a previous layer.

Illustratively, the forward propagation calculation in the optimal cost calculation model may indicate calculation of propagating a node value based on input data, in the direction facing the output layer from the input layer of the optimal cost calculation model. In other words, a node value of the node may be propagated (e.g., forward propagated) to a node (e.g., a next node) of a next layer connected with the node through the connection edge. For example, the node may receive a value weighted by the connection weight from a previous node (e.g., a plurality of nodes) connected through the connection edge.

The node value of the node may be determined based on applying the activation function to the sum (e.g., weighted sum) of weighted values received from previous nodes. The parameter of the neural network may illustratively include the above-mentioned connection weight. The parameter of the neural network may be updated to be changed in a direction in which an objective function value, which will be described below, is targeted (e.g., a direction in which a loss is minimized).

The trained optimal cost calculation model may indicate a model trained by use of machine learning and may be a trained machine learning model that outputs a training output (e.g., the target cell) from a training input (e.g., the first to third inputs and the sub-map).

The machine learning model (e.g. the trained optimal cost calculation model) may be generated by use of machine learning. A learning algorithm may include, for example, but is not limited to, supervised learning, unsupervised learning, semi-supervised learning, or reinforcement learning.

The machine learning model may include a plurality of artificial neural network layers. In detail, the trained optimal cost calculation model may include a shared layer including at least one convolution operation and a plurality of classifier layers (e.g., task-specific layers) connected with the shared layer. An artificial neural network may be, but is not limited to, a combination of at least one of a deep neural network (DNN), a convolutional neural network (CNN), a U-net for image segmentation (U-net), a recurrent neural network (RNN), a restricted Boltzmann machine (RBM), a deep belief network (DBN), a bidirectional recurrent deep neural network (BRDNN), or deep Q-networks, or any combination thereof, for example.

For supervised learning, the above-mentioned machine learning model may be trained based on training data including a pair of a training input and a training output mapped to the training input. For example, the machine learning model may be trained to output a training output from a training input. The machine learning model while trained may generate a temporary output in response to the training input and may be trained such that a loss of the temporary output and the training output (e.g., a training target) is minimized. A parameter of the machine learning model during a learning process (e.g., a connection weight between nodes/layers in the neural network) may be updated according to a loss. Such learning may be performed in the electronic device itself in which the machine learning model is performed or may be performed by use of a separate server. The machine learning model, the training of which is performed, (e.g., the trained optimal cost calculation model) may be stored in a memory (e.g., a memory 120 of FIG. 1).

Figure 3:
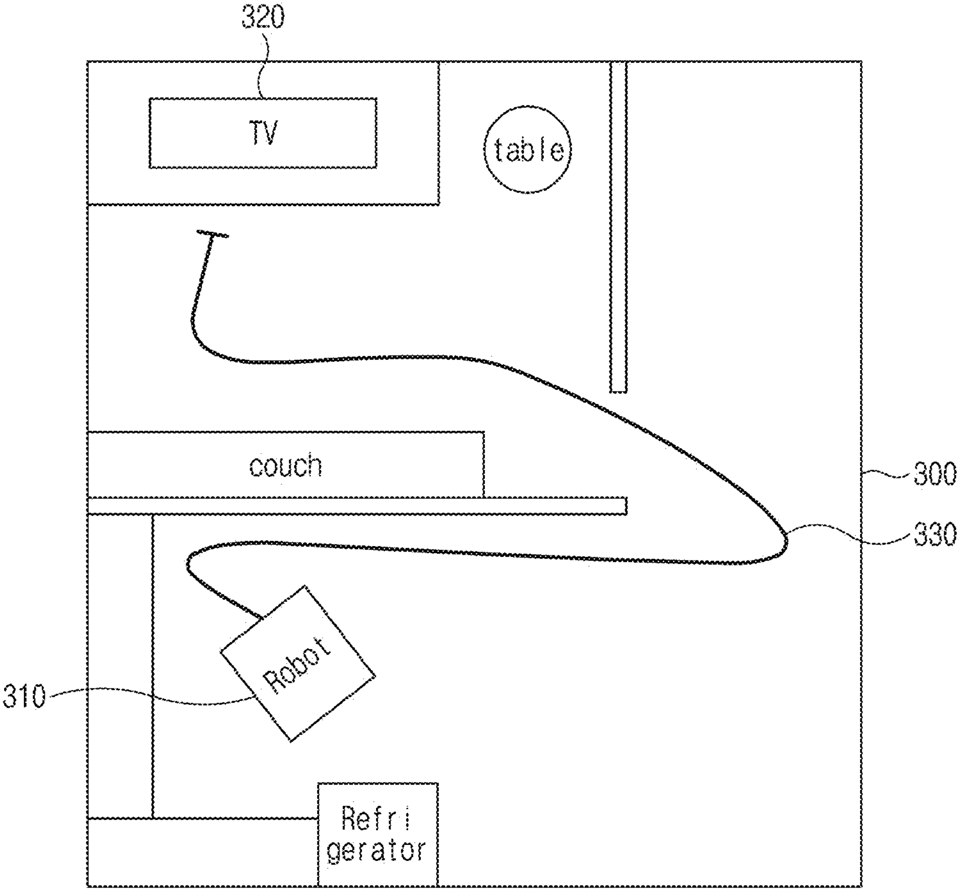
FIG. 3 is a drawing illustrating a movement path of a robot, which is generated by controlling the robot, in an electronic device according to an embodiment of the present disclosure.

FIG. 3 is a drawing illustrating a movement path of a robot, which can be generated by controlling the robot, in an electronic device according to an embodiment of the present disclosure.

In operation 210, an electronic device (e.g., an electronic device 100 of FIG. 1) according to an embodiment may control a robot 310 to move to a target object 320. For reference, for convenience of description in FIG. 3, it is described that the robot 310 and the target object 320 represent footprints of an actual robot and an actual target object on a semantic map 300.

The electronic device may determine a destination of the robot 310 to move the robot 310 to the target object 320. For example, the destination of the robot 310 may be different from a position of the target object 320. The electronic device may obtain a sub-map among areas identified at a selected, set, or predetermined distance with respect to the position of the target object 320. For reference, in FIG. 3, the space in which the target object 320 is located is illustrated as the sub-map. The electronic device may determine one of certain positions on the sub-map as the destination of the robot 310. In this regard, the electronic device may receive the target object as an input depending on a movement command and may output one point in a space in which the target object is located as the destination of the robot 310.

When determining the destination of the robot 310, the electronic device may determine a movement path 330 used in the operation of determining the destination of the robot 310 as a movement path of the robot 310 according to the movement command. For example, the movement path 330 may be based on a distance used in the operation of obtaining the third input described above relating to FIG. 1.

The electronic device may have no need to receive coordinates from a user and an external device to move the robot 310. For example, the electronic device may only receive the target object 320 to determine the destination of the robot 310 and may move the robot 310 to the determined destination. In detail, the electronic device may determine the destination of the robot 310, based on a semantic map and a cost map (in more detail, a global cost map). After determining the destination of the robot 310, the electronic device may move the robot 310. The electronic device may identify an obstacle around the robot 310 in the process of moving the robot 310. In such example case, the electronic device may redetermine the destination of the robot 310, based on the semantic map and the cost map (in more detail, a local cost map). A detailed description associated with redetermining the destination will be given in detail below with reference to FIG. 6.

Figure 4:
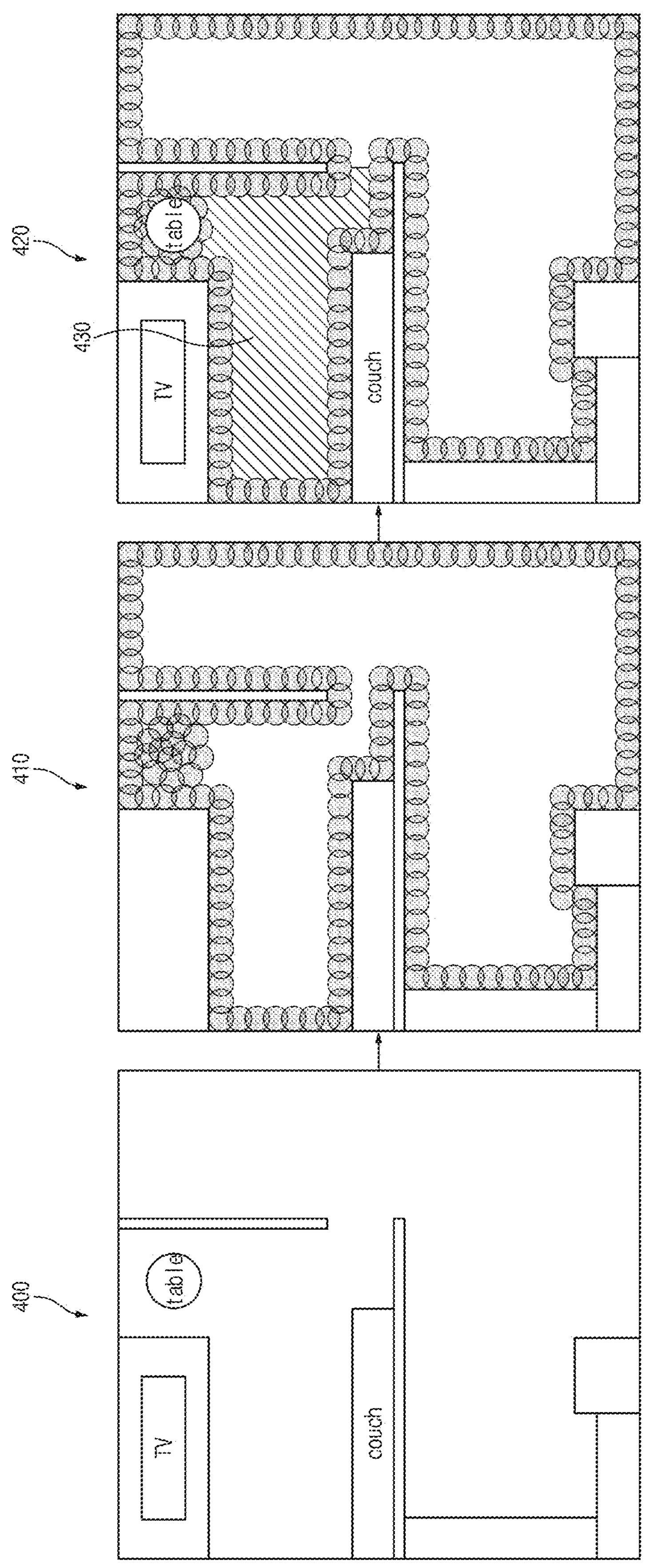
FIG. 4 is a drawing illustrating a method for obtaining a sub-map, in an electronic device according to an embodiment of the present disclosure.

FIG. 4 is a drawing illustrating a method for obtaining a sub-map, in an electronic device according to an embodiment of the present disclosure.

An electronic device (e.g., an electronic device 100 of FIG. 1) according to an embodiment may obtain a position of a target object represented on a semantic map 400. For example, the electronic device may apply the target object to the semantic map 400. The electronic device may recognize the target object from a movement command.

The electronic device may identify obstacles included in the semantic map 400, based on a map-based global cost map 410 generated by use of a light detection and ranging (LiDAR) sensor. Referring to FIG. 4, the global cost map 410 may include probabilities that obstacles included in the semantic map 400 may be located. The electronic device may combine the semantic map 400 with the global cost map 410 to obtain a sub-map 420. In other words, the sub-map 420 may be a map obtained from the semantic map 400, which may be obtained as a combination of the semantic map 400 and the global cost map 410.

The electronic device may determine an area excluding the obstacles identified from the semantic map 400 as a candidate area 430. In other words, the candidate area 430 may include the area excluding the obstacles identified from the semantic map 400 at the same time as including an area in which a robot is able to be located according to a movement command in an area identified at a selected, set, or predetermined distance with respect to the position of the target object.

The electronic device may determine the candidate area 430 as an area that is less than the selected, set, or predetermined distance near the target object. For example, when the selected, set, or predetermined distance is 5 m, the electronic device may determine an area within 5 m of a space and an area, which are separated like a wall and include the target object, as the candidate area 430. The electronic device may determine the candidate area 430, thus increasing the accuracy of the operation of determining the destination of the robot.

Figure 5A:
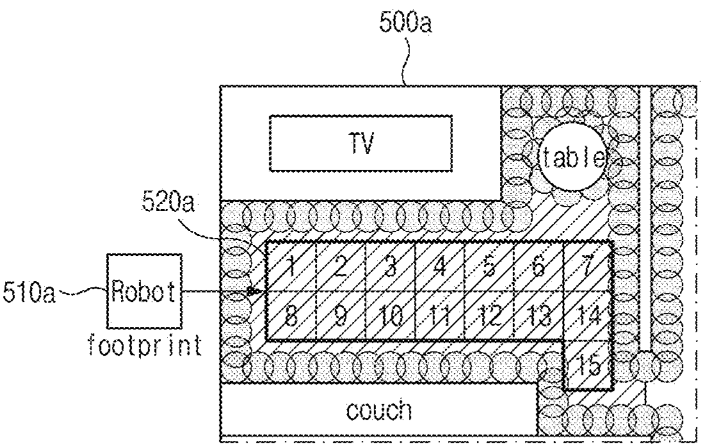
FIG. 5A is a drawing illustrating a method for segmenting a candidate area included in a sub-map into a plurality of cells, in an electronic device according to an embodiment of the present disclosure.

FIG. 5A is a drawing illustrating a method for segmenting a candidate area included in a sub-map into a plurality of cells, in an electronic device according to an embodiment of the present disclosure.

An electronic device (e.g., an electronic device 100 of FIG. 1) according to an embodiment may transition a size of a robot to a coordinate system of a sub-map 500*a* to obtain a footprint 510*a* indicating the size of the robot from the sub-map 500*a*. The electronic device may segment a candidate area 520*a* into a plurality of cells in which the robot is able to be located, based on a size of the footprint 510*a*.

The electronic device may segment the candidate area 520*a* into the plurality of cells, based on the sub-map 500*a* and the footprint 510*a* of the robot. Each of the plurality of cells may correspond to one area capable of being occupied in a space of the actual sub-map 500*a* by the actual robot. Illustratively, when the footprint 510*a* of the robot has a polygon shape, the electronic device may segment cells in the same shape as the polygon shape of the footprint 510*a* in the candidate area 520*a*. Referring to FIG. 5A, the electronic device may transition the size of the robot to the coordinate system of the sub-map 500*a* to obtain the rectangular footprint 510*a*.

The electronic device may segment the candidate area 520*a* into 15 cells, based on the size of the rectangular footprint 510*a*. The electronic device may determine at least one of the 15 cells as a destination of the robot. A detailed description of the method for determining the destination (i.e., a target cell) of the robot among the plurality of cells will be described in detail below with reference to FIG. 5B. Furthermore, the description of the number of the plurality of cells and the footprint 510*a* of the robot is only as shown in FIG. 5A as an example for convenience of description, but not limited thereto.

Figure 5B:
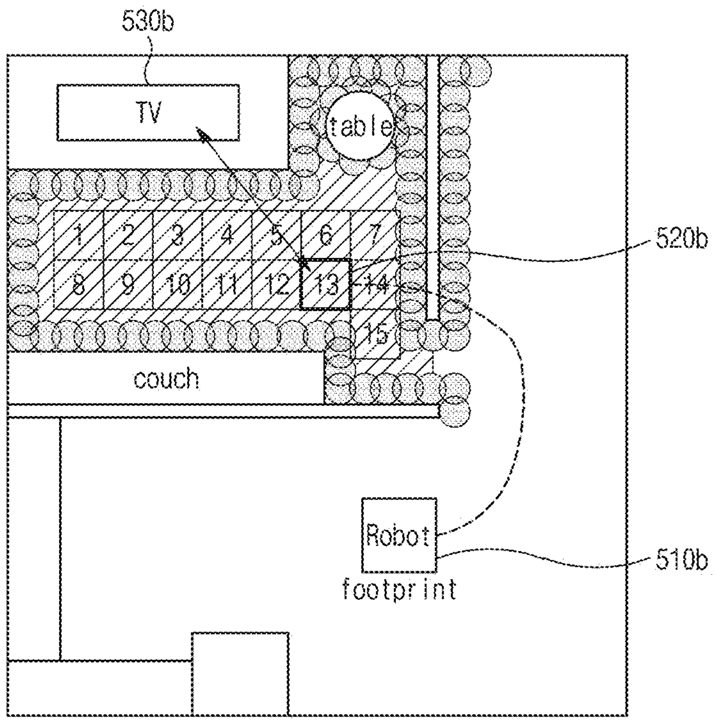
FIG. 5B is a drawing illustrating a method for determining a target cell in a candidate area included in a sub-map, in an electronic device according to an embodiment of the present disclosure.

FIG. 5B is a drawing illustrating a method for determining a target cell in a candidate area included in a sub-map, in an electronic device according to an embodiment of the present disclosure.

An electronic device (e.g., an electronic device 100 of FIG. 1) according to an embodiment may determine a target cell in the candidate area included in the sub-map.

The electronic device may apply the sub-map to a map-based global cost map generated by use of a LiDAR sensor to obtain a cost of each of a plurality of cells. For example, when the plurality of cells include 15 cells as shown in FIG. 5B, the electronic device may apply the sub-map to the global cost map to obtain costs of cells #1 to #15.

The electronic device may determine a first sub-input of a temporary cell 520*b* among a plurality of cells, which is included in a first input, based on comparison between a cost of the temporary cell 520*b* and a selected, set, or predetermined cost. For example, the cost of the temporary cell 520*b* may be obtained from the global cost map. The first input may include the first sub-input of each of the plurality of cells. The first sub-input may include a value determined based on comparison between the cost of the cell and the selected, set, or predetermined cost. Illustratively, when the cost of the temporary cell 520*b* is greater than or equal to "250", the first sub-input of the temporary cell 520*b* (e.g., a value included in the first input) may be "−5".

The electronic device may determine a second sub-input of the temporary cell 520*b*, which is included in a second input, based on a first distance that is a straight line between a center position of the temporary cell 520*b* and a target object 530*b*. The second input may include the second sub-input of each of the plurality of cells. The second sub-input may include a value determined based on comparison between the first distance of the cell (e.g., the straight distance between the center position of the cell and the target object 530*b*) and a selected, set, or predetermined distance. Illustratively, when the distance between the cell and the target object 530*b* is less than 1 meter, for example, the above-mentioned second sub-input of the cell (e.g., the value about the distance) may be "10". However, the first distance is not limited thereto. For example, the first distance may include a shortest distance between the center position of the temporary cell 520*b* and the target object 530*b*.

The electronic device may determine a third sub-input of the temporary cell 520*b*, which is included in a third input, based on a second distance that is a path distance about a path along which a robot 510*b* moves to the center position of the temporary cell 520*b*. The third input may include the third sub-input of each of the plurality of cells. The third sub-input may include a value determined based on comparison between the second distance of the cell (e.g., the path distance about the path along which the robot 510*b* moves to the center position of the temporary cell 520*b*) and the selected, set, or predetermined distance. Illustratively, when the distance between the cell and the robot 510*b* is less than 1 meter, for example, the above-mentioned third sub-input of the cell (e.g., the value about the distance) may be "5".

In conjunction with obtaining the first distance and the second distance, the electronic device may perform the following operation. For example, the electronic device may identify a position of the target object 530*b* and a position of the robot 510*b* from a semantic map. The electronic device may determine a straight line between the center position of the temporary cell 520*b* and the position of the target object 530*b* as the first distance. The electronic device may apply the center position of the temporary cell 520*b* and the position of the robot 510*b* to a path generation model trained to determine or calculate a path, thus obtaining a path along which the robot 510*b* moves to the center position of the temporary cell 520*b*. Thereafter, the electronic device may determine a length of the path obtained from the path generation model as the second distance. The path generation model may obtain and output a path, depending on a path generation algorithm, such as A* algorithm or Dijkstra's algorithm, from an input such as at least two positions and points. However, the path generation algorithm is not limited thereto, which may include any of or all of a plurality of algorithms associated with path generation.

The electronic device may determine a movement cost of the temporary cell 520*b*, based on at least one of the first sub-input, the second sub-input, or the third sub-input, or any combination thereof. In detail, the electronic device may determine the movement cost of the temporary cell 520*b*, based on all the first to third sub-inputs. Illustratively, the electronic device may determine a value obtained by adding the first sub-input, the second sub-input, and the third sub-input as the movement cost of the temporary cell 520*b*, for example. For reference, the movement cost of the temporary cell 520*b* may be a cost different from a cost of the temporary cell 520*b* obtained from the global cost map.

The electronic device may determine a cell with the lowest movement cost among the plurality of cells as a target cell, based on that movement costs of all cells included in the plurality of cells are determined. However, the method for determining the target cell is not limited thereto. For example, the electronic device may determine a cell with the highest movement cost among the plurality of cells as the target cell. In other words, the method for determining the target cell may vary with the method for calculating and determining the movement cost of each of the plurality of cells.

The electronic device may receive a weight group for determining the target cell. Illustratively, the electronic device may identify a first weight, a second weight, and a third weight from the weight group. The electronic device may determine the target cell, based on at least one of a value obtained by applying the first weight to the first input (more specifically, the first sub-input of the temporary cell 520*b*), a value obtained by applying the second weight to the second input (more specifically, the second sub-input of the temporary cell 520*b*), or a value obtained by applying the third weight to the third input (more specifically, the third sub-input of the temporary cell 520*b*), or any combination thereof. Illustratively, the electronic device may determine a value obtained by adding the value obtained by applying the first weight to the first input, the value obtained by applying the second weight to the second input, and the value obtained by applying the third weight to the third input as the movement cost of the cell, for example. Furthermore, the electronic device may compare movement costs of cells, the movement costs of which are determined depending the sum of the weights, to determine the target cell. Thereafter, the electronic device may control the robot 510*b* to move to a center position of the target cell, based on that the target cell is determined.

Figure 6:
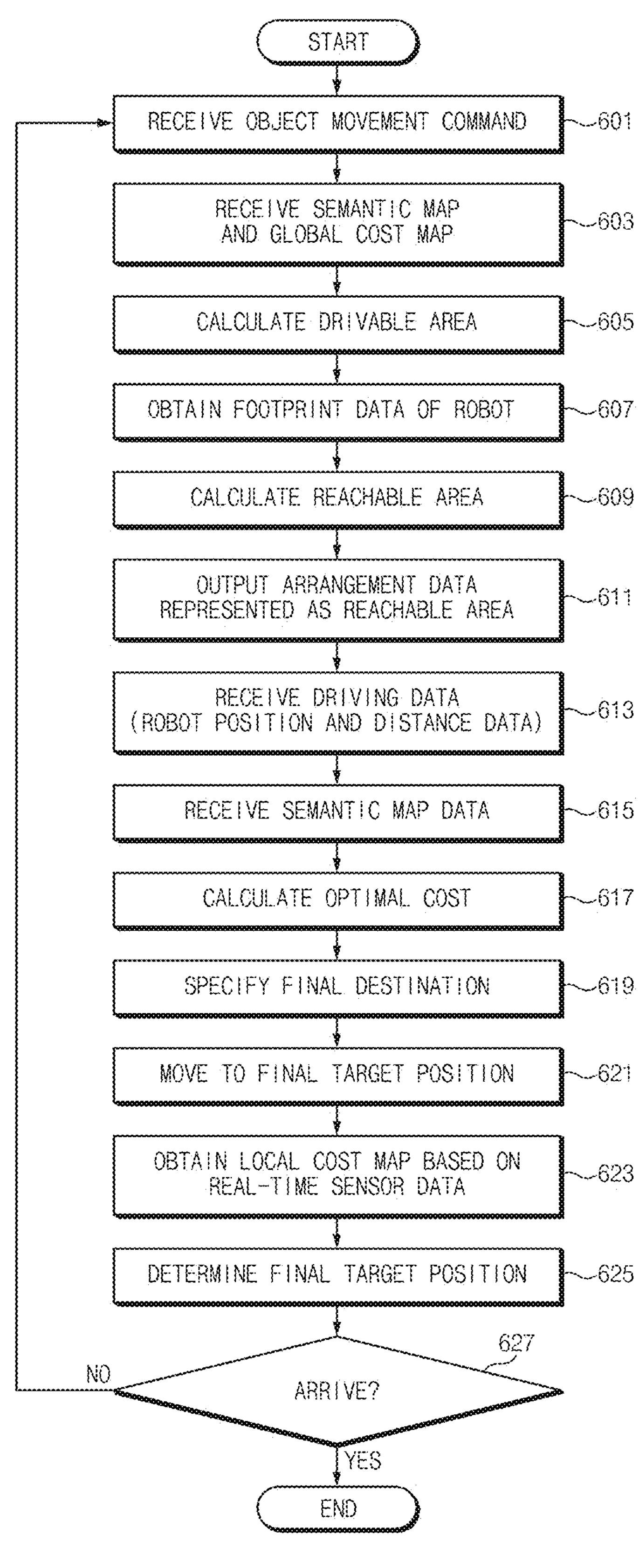
FIG. 6 is a flowchart for describing a control method of a robot, in an electronic device according to an embodiment of the present disclosure.

FIG. 6 is a flowchart for describing a control method of a robot, in an electronic device according to an embodiment of the present disclosure.

In operation 601, the electronic device according to an embodiment may receive an object movement command. For example, the electronic device may receive a movement command to move a robot to a target object as command data.

In operation 603, the electronic device may receive a semantic map and a global cost map. For example, the electronic device may receive the semantic map and the global cost map to move the robot to the target object, more specifically, to determine a destination of the robot.

In operation 605, the electronic device may determine/calculate and obtain a drivable area. For example, the electronic device may calculate and obtain a sub-map, including a candidate area in which the robot is able to be located according to the movement command among areas identified at a selected, set, or predetermined distance with respect to the position of the target object, as the drivable area. A detailed description associated with it may be the same as the description described above with reference to FIG. 3.

In operation 607, the electronic device may obtain footprint data of the robot. For example, the electronic device may apply a size of the robot to the sub-map to obtain a footprint of the robot.

In operation 609, the electronic device may determine/calculate and obtain a reachable area. For example, the electronic device may segment the candidate area into a plurality of cells based on the footprint of the robot, thus calculating and obtaining the reachable area. Thereafter, in operation 611, the electronic device may output arrangement data (e.g., the plurality of cells) represented as the reachable area.

In operations 613 to 617, the electronic device may calculate and obtain an optimal cost. For example, the optimal cost may indicate a movement cost of the cell. The electronic device may determine a movement cost of each of the plurality of cells, based on driving data (e.g., pieces of position and distance data of the robot) and the semantic map. A detailed description associated with it may be the same as the description described above with reference to FIGS. 5A and 5B.

In operations 619 and 621, the electronic device may control the robot to move to a final destination. For example, the final destination may include a target cell. The electronic device may determine a cell with the lowest movement cost among the plurality of cells as the target cell, based on that movement costs of all cells included in the plurality of cells are determined. The electronic device may control the robot to move to a center position of the target cell (i.e., the final destination), based on the target cell being determined.

In operation 623, the electronic device may obtain a local cost map based on real-time sensor data. For example, the electronic device may obtain a map-based local cost map generated by use of a sensor included in/on the robot, from a time point when the robot is controlled to move to the center position of the target cell.

The electronic device may identify an obstacle that is present in the area identified at the selected, set, or predetermined distance with respect to the position of the robot, based on the local cost map. When the obstacle is identified, the electronic device may recognize presence of the obstacle that is not represented on the global cost map or may determine that the target object is moved. The electronic device may determine whether the obstacle is included in a path along which the robot moves to the center position of the target cell, based on identifying the obstacle from the local cost map. The electronic device may redetermine the target cell which is the destination of the movement command among the plurality of cells, on the basis of the position of the robot, based on that the obstacle is included in the path of the robot (i.e., a movement path about a second distance between the robot and the target cell).

In operation 627, the electronic device may determine whether the robot arrives at the target object, based on determining whether the robot is located at the final destination in operation 625. In other words, when the robot is located at the final destination, the electronic device may determine that the robot arrives at the target object. When the robot does not arrive at the target object, the electronic device may perform the above-mentioned operations again from operation 601.

Figure 7:
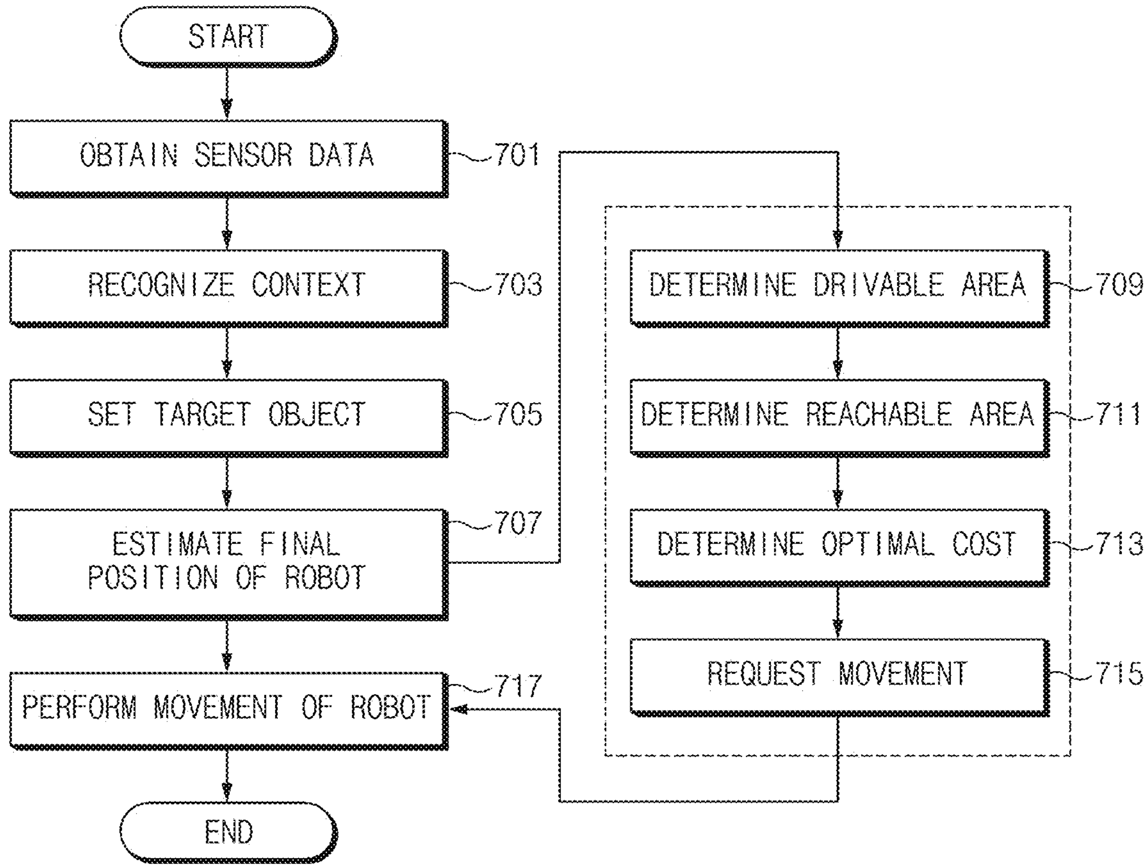
FIG. 7 is a flowchart for describing a method for determining a target cell, in an electronic device according to an embodiment of the present disclosure.

FIG. 7 is a flowchart for describing a method for determining a target cell, in an electronic device according to an embodiment of the present disclosure.

In operation 701, an electronic device (e.g., an electronic device 100 of FIG. 1) according to an embodiment may obtain sensor data. The electronic device may obtain a semantic map, based on obtained sensor data.

In operations 703 and 705, the electronic device may recognize a context from the semantic map and may set a target object. For example, the electronic device may recognize the context, thus determining semantic information including meaning of an object, a degree of understanding of a scene, or pieces of information of an environment, or any combination thereof. The electronic device may set the target object in the semantic map, based on identifying a movement command to move a robot to the target object.

In operation 707, the electronic device may estimate a final position of the robot. For example, the final position of the robot may include a point and an area in which the robot will be located according to the movement command. Thereafter, in operations 709 to 715, the electronic device may determine a destination of the robot depending the movement command and may determine a movement path of the robot. For reference, because the description of operations 709 to 715 is able to be the same as the operations described above with reference to FIGS. 3 to 6, it will be omitted from the description of FIG. 7.

In operation 717, the electronic device may control the robot to move to a center position of a target cell (i.e., the destination which is a final position of the robot), based on that the target cell is determined.

Figure 8:
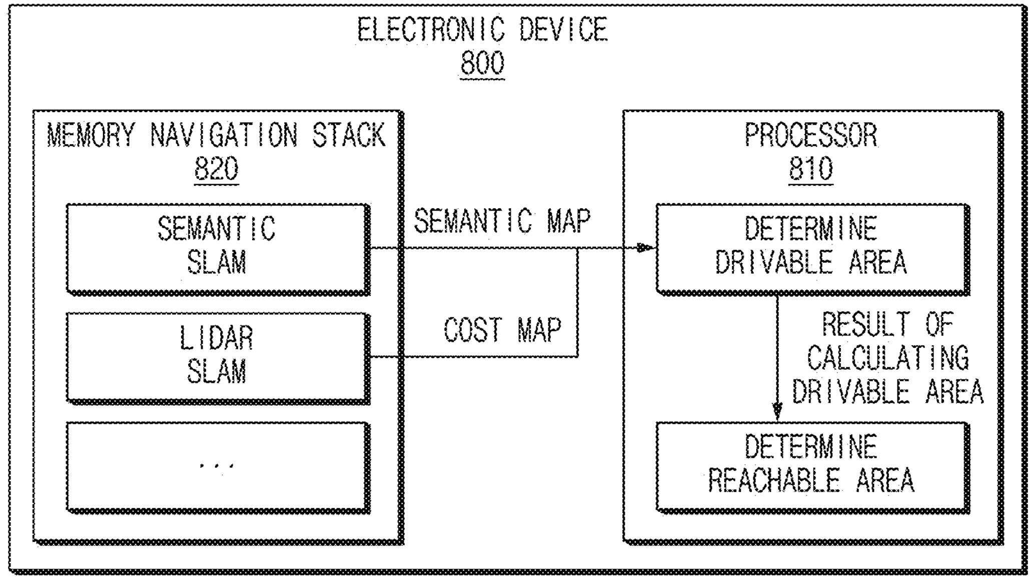
FIG. 8 is a drawing illustrating a navigation stack, in an electronic device according to an embodiment of the present disclosure.

FIG. 8 is a drawing illustrating a navigation stack, in an electronic device according to an embodiment of the present disclosure.

An electronic device 800 according to an embodiment may include a processor 810 and a memory 820. The electronic device 800 may store a navigation stack in the memory 820. For example, the navigation stack may indicate a technology stack for moving a robot. In detail, the navigation stack may include semantic simultaneous localization and mapping (SLAM) and LIDAR SLAM. The electronic device 800 may obtain a semantic map from the semantic SLAM and may obtain a cost map from the LiDAR SLAM.

The processor 810 of the electronic device 800 may determine a drivable area and a reachable area. Illustratively, the drivable area may include an area in which the robot is able to move because there is no obstacle near the target object. The reachable area may include an area in which the robot is able to be located in the drivable area. In detail, the processor 810 may determine the drivable area, based on the semantic map and the cost map. The processor 810 may determine the reachable area, based on the result of calculating the drivable area.

When navigating the target object and receiving a movement command from a user, the electronic device 800 may provide a method capable of moving the robot to a position suitable for an intention of the user. Furthermore, the electronic device 800 may provide a method capable of reflecting environmental information capable of being changed in real time to calculate a path to a destination and move to the destination, even without manually inputting information about the destination.

Figure 9:
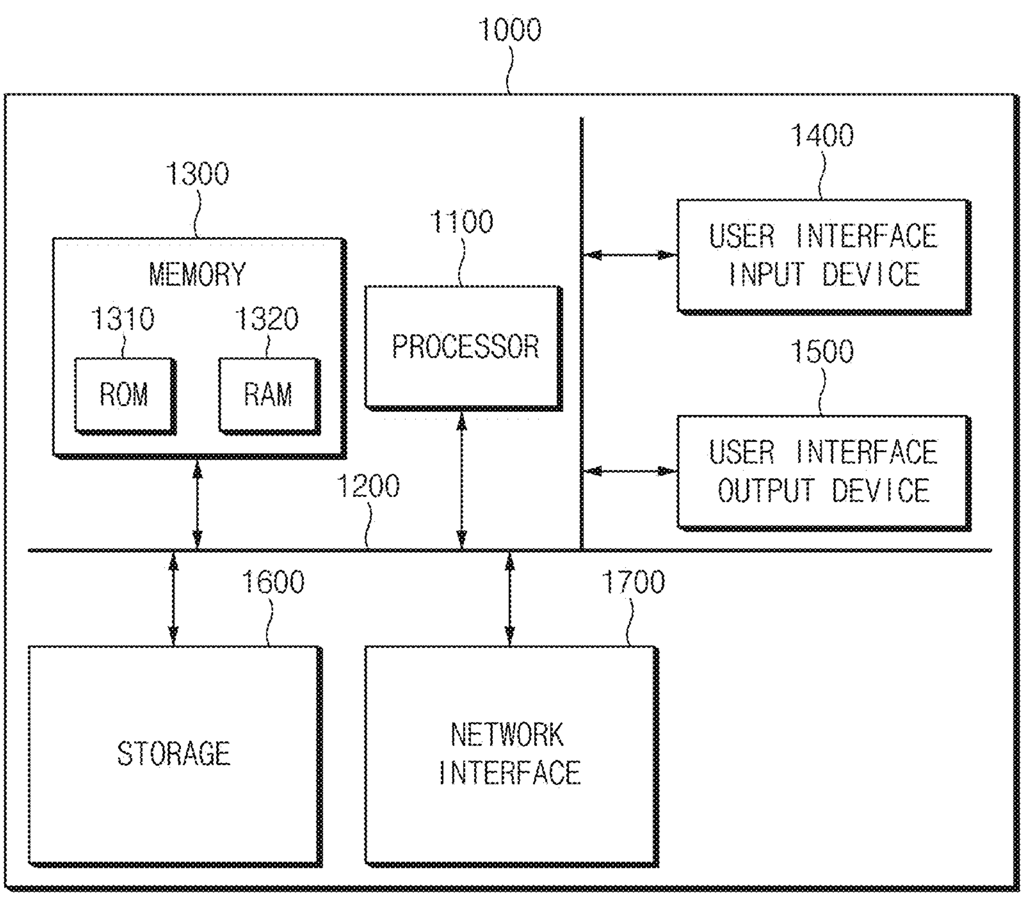
FIG. 9 is a drawing illustrating a computing system associated with an electronic device or a control method thereof according to an embodiment of the present disclosure.

FIG. 9 is a drawing illustrating a computing system associated with an electronic device or a control method thereof according to an embodiment of the present disclosure.

Referring to FIG. 9, a computing system 1000 about the electronic device or the control method thereof may include at least one processor 1100, a memory 1300, a user interface input device 1400, a user interface output device 1500, storage 1600, and a network interface 1700, which are connected with each other via a bus 1200, any combination of or all of which may be in plural or may include plural components thereof.

The processor 1100 may be a central processing unit (CPU) or a semiconductor device that processes instructions stored in a storage medium, such as the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory and/or the storage) such as a RAM, a flash memory, a ROM, an EPROM, an EEPROM, a register, a hard disc, a removable disk, and a CD-ROM.

The example storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to example embodiments and the accompanying drawings, the present disclosure is not necessarily limited thereto, but may be variously modified and altered, including equivalents thereof, by those skilled in the art to which the present disclosure pertains without departing from the spirit and scopes of the present disclosure claimed in the following claims.

The above-described embodiments may be implemented with hardware components, software components, and/or a combination of hardware components and software components. For example, the devices, methods, and components described in the embodiments may be implemented using general-use computers or special-purpose computers, such as a processor, a controller, an arithmetic logic unit (ALU), a digital signal processor, a microcomputer, a field programmable array (FPGA), a programmable logic unit (PLU), a microprocessor, or any device which may execute instructions and respond. A processing unit may perform an operating system (OS) or a software application running on the OS. Further, the processing unit may access, store, manipulate, process and generate data in response to execution of software. It can be understood by those skilled in the art that although a single processing unit may be illustrated for convenience of understanding, the processing unit may include a plurality of processing elements and/or a plurality of types of processing elements, together or separated. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner and/or in a distributed manner. Software and data may be recorded in one computer-readable storage media.

The methods according to embodiments may be implemented in the form of program instructions that may be executed through various computer implementations and may be recorded in computer-readable media. The computer-readable media may include program instructions, data files, data structures, and the like, alone or in combination, and the program instructions recorded on the media may be specially designed and configured for an example or may be known and usable to those skilled in the art of computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

The above-described hardware devices may be configured to act as one or a plurality of software modules to perform the operations of the embodiments, or vice versa.

Even though the example embodiments are described with reference to restricted drawings, it may be understood to one skilled in the art that other embodiments can be variously changed or modified based on the above description. For example, adequate effects may be achieved even if the foregoing processes and methods are carried out in different order than described above, and/or the aforementioned components, such as systems, structures, devices, or circuits, are combined or coupled in different forms and modes than as described above or be substituted or switched with other components or equivalents.

A description will be given of effects and advantages of the electronic device and the control method thereof according to an embodiment of the present disclosure.

According to an embodiment of the present disclosure, the electronic device may divide a plurality of cells in which the robot is able to be located, in a sub-map obtained based on a semantic map and a cost map and determine a target cell that is a destination based on costs of the cells and a distance between an object and the robot, thus determining the target cell to perform a command to move from a user to a target object to be suitable for an intention of the user.

According to an embodiment of the present disclosure, the electronic device may generate a map-based local cost map by use of a sensor included in/on the robot from a time point when the robot is controlled to move to the center position of the target cell, thus identifying an obstacle located in an area included in a selected, set, or predetermined distance with respect to the position of the robot and redetermining the target cell depending to the position of the obstacle.

Various effects and advantages ascertained directly or indirectly through the present disclosure may be provided.

Therefore, other implements, other embodiments, and equivalents to claims can be within the scopes of the following claims.

Therefore, example embodiments of the present disclosure are not intended to necessarily limit the technical spirit of the present disclosure, but rather are provided for illustrative purposes. The scopes of the present disclosure can be construed on the basis of the accompanying claims, and technical ideas within scopes equivalent to the claims can be included in the scopes of the present disclosure.

What is claimed is:

1. An electronic device, comprising:

one or more processors; and a storage medium storing computer-readable instructions that, when executed by the one or more processors, enable the one or more processors to:

obtain, from a semantic map, a sub-map including a candidate area in which a robot is able to be located according to a movement command to move the robot to a target object, wherein the candidate area is within a set distance with respect to a target object position of the target object;

segment the candidate area into a plurality of cells, based on a footprint of the robot;

determine a target cell among the plurality of cells, wherein the target cell is a destination of the movement command among the plurality of cells, based on one of or any combination of a first input about a cost of each of the plurality of cells, a second input about a cell-target distance between each of the plurality of cells and the target object, and a third input about a cell-robot distance between each of the plurality of cells and the robot;

apply the sub-map to a map-based global cost map generated based on sensor data to obtain the cost of each of the plurality of cells;

determine a first sub-input of a temporary cell among the plurality of cells, the first sub-input being included in the first input, based on comparing a temporary cell cost of the temporary cell and a threshold cost;

determine a second sub-input of the temporary cell, the second sub-input being included in the second input, based on a first distance being a straight distance between a temporary cell center position of the temporary cell and the target object;

determine a third sub-input of the temporary cell, the third sub-input being included in the third input, based on a second distance being a path distance for a path along which the robot would travel to the temporary cell center position of the temporary cell;

determine a movement cost of the temporary cell, based on one of or any combination of the first sub-input, the second sub-input, and the third sub-input; and control the robot to move to a target cell center position of the target cell, based on the target cell being determined.

2. The electronic device of claim 1, wherein the instructions further enable the one or more processors to:

recognize the target object from the movement command;

apply the target object to the semantic map to obtain the target object position of the target object represented on the semantic map;

identify obstacles included in the semantic map, based on the map-based global cost map; and determine at least part of a boundary of the candidate area from the semantic map by excluding the identified obstacles.

3. The electronic device of claim 1, wherein the instructions further enable the one or more processors to:

transition a size of the robot to a coordinate system of the sub-map to obtain the footprint of the robot, wherein the footprint of the robot indicates the size of the robot relative to the sub-map; and segment the candidate area into the plurality of cells in which the robot is able to be located, based on the footprint of the robot.

4. The electronic device of claim 1, wherein the instructions further enable the one or more processors to:

receive a weight group for determining the target cell;

identify a first weight, a second weight, and a third weight from the weight group; and determine the target cell, based on one of or any combination of a first value obtained by applying the first weight to the first input, a second value obtained by applying the second weight to the second input, and a third value obtained by applying the third weight to the third input.

5. The electronic device of claim 1, wherein the instructions further enable the one or more processors to:

identify the target object position of the target object and a robot position of the robot from the semantic map;

determine the straight distance between the temporary cell center position of the temporary cell and the target object position of the target object as the first distance;

apply the temporary cell center position of the temporary cell and the robot position of the robot to a path generation model trained to calculate and obtain the path along which the robot would travel to the temporary cell center position of the temporary cell; and determine a length of the path obtained from the path generation model as the second distance.

6. The electronic device of claim 1, wherein the instructions further enable the one or more processors to determine a lowest movement cost cell having a lowest movement cost among the plurality of cells as the target cell, based on determining the movement cost of each of the plurality of cells.

7. The electronic device of claim 1, wherein the instructions further enable the one or more processors to:

obtain a map-based local cost map generated by use of a sensor included in the robot, from a time point when the robot is controlled to move to the target cell center position of the target cell; and identify an obstacle being present in a robot area identified at a buffer distance with respect to a robot position of the robot, based on the map-based local cost map.

8. The electronic device of claim 7, wherein the instructions further enable the one or more processors to:

determine whether the obstacle is included in a path along which the robot moves to the target cell center position of the target cell, based on identifying the obstacle from the map-based local cost map; and redetermine the target cell being the destination of the movement command among the plurality of cells, based on the robot position of the robot, in response to the obstacle being included in the path of the robot.

9. A control method, comprising:

identifying a movement command from command data;

obtaining a sub-map, from a semantic map, including a candidate area in which a robot is able to be located according to the movement command to move the robot to a target object, wherein the candidate area is within a set distance with respect to a target object position of the target object;

segmenting the candidate area into a plurality of cells, based on a footprint of the robot;

determining a target cell among the plurality of cells, wherein the target cell is a destination of the movement command among the plurality of cells, based on one of or any combination of a first input about a cost of each of the plurality of cells, a second input about a cell-target distance between each of the plurality of cells and the target object, and a third input about a cell-robot distance between each of the plurality of cells and the robot; and controlling the robot to move to a target cell center position of the target cell, based on the determining of the target cell, wherein determining the target cell includes:

applying the sub-map to a map-based global cost map generated based on sensor data to obtain the cost of each of the plurality of cells;

determining a first sub-input of a temporary cell among the plurality of cells, the first sub-input being included in the first input, based on comparing a temporary cell cost of the temporary cell and a threshold cost;

determining a second sub-input of the temporary cell, the second sub-input being included in the second input, based on a first distance being a straight distance between a temporary cell center position of the temporary cell and the target object;

determining a third sub-input of the temporary cell, the third sub-input being included in the third input, based on a second distance being a path distance for a path along which the robot would travel to the temporary cell center position of the temporary cell; and determining a movement cost of the temporary cell, based on one of or any combination of the first sub-input, the second sub-input, and the third sub-input.

10. The method of claim 9, wherein obtaining the sub-map comprises:

recognizing the target object from the movement command;

applying the target object to the semantic map to obtain the target object position of the target object represented on the semantic map;

identifying obstacles included in the semantic map, based on the map-based global cost map; and determining at least part of a boundary of the candidate area from the semantic map by excluding the identified obstacles.

11. The method of claim 9, wherein segmenting the candidate area into the plurality of cells comprises:

transitioning a size of the robot to a coordinate system of the sub-map to obtain the footprint of the robot, wherein the footprint of the robot indicates the size of the robot relative to the sub-map; and segmenting the candidate area into the plurality of cells in which the robot is able to be located, based on the footprint of the robot.

12. The method of claim 9, wherein determining the target cell further comprises:

receiving a weight group;

identifying a first weight, a second weight, and a third weight from the weight group; and determining the target cell, based on one of or any combination of a first value obtained by applying the first weight to the first input, a second value obtained by applying the second weight to the second input, and a third value obtained by applying the third weight to the third input.

13. The method of claim 9, further comprising:

identifying the target object position of the target object and a robot position of the robot from the semantic map;

determining the straight distance between the temporary cell center position of the temporary cell and the target object position of the target object as the first distance;

applying the temporary cell center position of the temporary cell and the robot position of the robot to a path generation model trained to calculate and obtain the path along which the robot would travel to the temporary cell center position of the temporary cell; and determining a length of the path obtained from the path generation model as the second distance.

14. The method of claim 9, wherein determining the target cell further comprises determining a lowest movement cost cell having a lowest movement cost among the plurality of cells as the target cell, based on having determined the movement cost of each of the plurality of cells.

15. The method of claim 9, wherein controlling the robot includes:

obtaining a map-based local cost map generated by use of a sensor included in the robot, from a time point when the robot is controlled to move to the target cell center position of the target cell; and identifying an obstacle being present in a robot area identified at a buffer distance with respect to a robot position of the robot, based on the map-based local cost map.

16. The method of claim 15, wherein controlling the robot further includes:

determining whether the obstacle is included in a path along which the robot moves to the target cell center position of the target cell, based on the identifying of the obstacle from the map-based local cost map; and redetermining the target cell being the destination of the movement command among the plurality of cells, based on the robot position of the robot, in response to the obstacle being included in the path of the robot.

* * * * *